United States Patent [19]

Benedick et al.

[11] Patent Number: 4,783,382
[45] Date of Patent: Nov. 8, 1988

[54] SHOCK-ACTIVATED ELECTROCHEMICAL POWER SUPPLIES

[75] Inventors: William B. Benedick, Albuquerque; Robert A. Graham, Los Lunas; Bruno Morosin, Albuquerque, all of N. Mex.

[73] Assignee: The United States of America as represented by the United States Department of Energy, Washington, D.C.

[21] Appl. No.: 39,853

[22] Filed: Apr. 20, 1987

[51] Int. Cl.[4] .............................................. H01M 6/20
[52] U.S. Cl. ........................................ 429/52; 429/112
[58] Field of Search ........................... 429/52, 112, 115

[56] References Cited

U.S. PATENT DOCUMENTS

| | | | |
|---|---|---|---|
| 3,516,868 | 6/1970 | Nee et al. | 429/52 |
| 4,053,690 | 10/1977 | Backlund | 429/112 |
| 4,596,752 | 6/1986 | Faul et al. | 429/112 |

FOREIGN PATENT DOCUMENTS

| | | | |
|---|---|---|---|
| 46-38218 | 11/1971 | Japan | 429/112 |
| 47-33690 | 8/1972 | Japan | 429/115 |

OTHER PUBLICATIONS

Shunin et al., Electric Conductivity of Liquid Bromine Under Dynamic Compression up to 30 GPa, Translation from Doklady Akademii Nauk SSSR, vol. 251, No. 3, pp. 648–649, Mar. 1980.

Antepenko, et al., Electrical Conductivity of Tetranitromethane Detonation Products, Translated from Fizika Goreniyae Vzryva, vol. 16, No. 4, pp. 116–120, Jul.–Aug. 1980.

Breusov et al. (I), Electrochemical Effects in Shock Waves, II. Effect of the Nature of the Electrolytes and the Shock Wave Parameters, Translated from Elektrokhimiya, vol. 7, No. 3, pp. 411–413, Mar. 1971.

Breusov et al. (II), Electrochemical Effects in Shock Waves, Translated from Elektrokhimiya, vol. 5, No. 6, pp. 719–721, Jun. 1969.

Yakushev et al., Electrochemical Phenomena in the Shock Compression of Dielectrics, Translated from Int. Synp. Explos., Cladding, First, 1970, 1971, pp. 259–266.

Primary Examiner—Donald L. Walton
Attorney, Agent, or Firm—Armand McMillan; James H. Chafin; Hudson R. Hightower

[57] ABSTRACT

A shock-activated electrochemical power supply is provided which is initiated extremely rapidly and which has a long shelf life. Electrochemical power supplies of this invention are initiated much faster than conventional thermal batteries. Power supplies of this invention comprise an inactive electrolyte and means for generating a high-pressure shock wave such that the shock wave is propagated through the electrolytes rendering the electrolyte electrochemically active.

5 Claims, 1 Drawing Sheet

SHOCK-ACTIVATED ELECTROCHEMICAL POWER SUPPLIES

The U.S. Government has rights in this invention pursuant to Contract No. DE-AC04-76DP00789 between the U.S. Department of Energy and AT&T Technologies, Inc.

BACKGROUND OF THE INVENTION

This invention relates to shock-activated electrochemical power supplies. Various types of electrochemical power supplies have long been known in the art. One such electrochemical power supply is known as the thermal battery and comprises at least one electrochemical cell comprising a cathode, an anode and an electrolyte which is inactive at ambient temperatures but which is rendered active at higher temperatures. Such thermal batteries frequently employ a solid electrolyte formed from a eutectic mixture of one or more materials which are electrochemically inactive when solid but which become electrochemically active when molten. The means for activating such a thermal battery is generally a pyrotechnic heat source. The battery is activated by igniting the pyrotechnic heat source which heats the electrolyte causing the electrolyte materials to fuse and become a highly conductive fluid. See, e.g., *The Primary Battery*, Cahon, et al., John Wiley & Sons, 1976, Chapter 6; and Japanese patent No. 021,098, Aug. 26, 1972.

Thermal batteries have several advantages over simple galvanic and acid batteries. They exhibit long stand times and can be activated when an electrical current is desired, but until such time as such a battery is activated it remains inactive and chemically inert. Despite these advantages thermal batteries possess inherent disadvantages. Particularly disadvantageous is the fact that the initiation time of such batteries, i.e., the time required to render the electrolyte active, is limited at the lower end to the time required to ignite the pyrotechnic device and the time required to transfer the resultant thermal energy to the electrolyte. Thus, conventional thermal batteries are undesirable in situations where extremely rapid initiation times are desirable.

Shock-activated power sources are also known in the prior art. Prior art shock-activated power supplies employ an active signal generating element such as a piezoelectric crystal or ferroelectric or ferromagnetic circuit. However, such prior art systems are disadvantageous in that they produce an electric current or signal only during the time the pressure or shock is applied to the active element. Thus, such prior art shock-activated power supplies provide an electrical pulse having a duration of, e.g., only a few microseconds.

SUMMARY OF THE INVENTION

It is accordingly an object of this invention to provide an electrochemical power supply which has a long stand time.

Another object of this invention is to provide an electrochemical power supply having an extremely short initiation time in comparison to those of the prior art.

Another object of this invention is to provide a shock-activated electrochemical power supply having a duration which persists substantially longer than the duration of the shock wave which initiates the power supply.

Another object of this invention is to provide a method of initiating an electrochemical cell which is rapid and reliable.

Yet another object of this invention is to provide an electrochemical power supply which is highly reliable even after long periods of storage.

Upon further study of the specification and appended claims, further objects and advantages of this invention will become apparent to those skilled in the art.

According to one aspect of this invention, the foregoing objects are attained by providing an electrochemical power supply which comprises an inactive electrolyte material which is capable of being rendered electrochemically active by a high-pressure shock wave and means for generating said high-pressure shock wave operatively associated with said electrolyte such that the generated shock wave propagates through the electrolyte and renders the electrolyte electrochemically active.

According to another aspect of this invention, these objects are attained by initiating an electrochemical power supply, which power supply comprises an inactive electrolyte material which is capable of being rendered electrochemically active by a high-pressure shock wave comprising subjecting said electrolyte to a high-pressure shock wave sufficient to render said electrolyte electrochemically active.

DETAILED DESCRIPTION OF THE DRAWINGS

Figure 1:
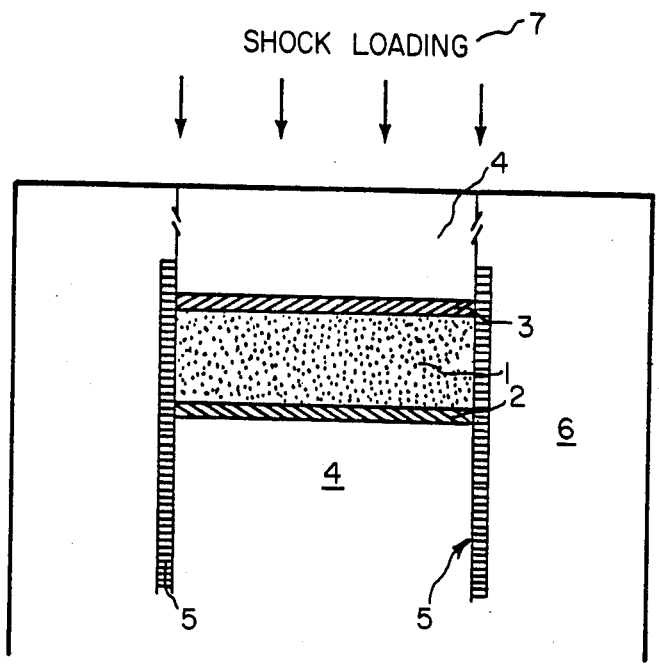
FIG. 1 is a schematic representation of a shock-activated electrochemical power supply of this invention.

The electrochemical power supply of this invention is a one-shot shock-initiated power supply. The power supply is based on the activation of a solid electrolyte in an electrochemical cell by means of high-pressure shock loading.

In general, electrochemical power supplies of this invention comprise a normally inactive electrolyte material which is capable of being rendered electrochemically active by a high-pressure shock wave. Typically, such electrolyte material is solid at ambient temperatures. At elevated temperatures, the electrolyte becomes molten and fuses into a liquid mass. When such an electrolyte is part of an electrochemical cell which comprises, e.g., an anode and a cathode, an electrical potential is established between the electrodes.

The invention, inter alia, provides a means for initiating such an electrochemical cell. As used herein, the term initiation, refers to the transition of the electrolyte from its inactive to its active state. In the example above, the electrolyte is inactive when solid, but becomes active when molten. Thus, initiation in such a case refers to heating a solid electrolyte to render it molten and thereby active.

This is accomplished in the present invention by subjecting such an electrolyte to a high-pressure shock wave. In general, such a high-pressure shock wave rapidly compresses the electrolyte which results in extremely rapid heating of the electrolyte. Thus, in one aspect of this invention, a high-pressure shock wave is used to rapidly heat the electrolyte, causing the electrolyte to become molten and fuse and thereby to become electrochemically active.

However, initiation is not limited to mere heating of a solid electrolyte to render it molten and thereby electrochemically active. The precise mechanism by which a high-pressure shock wave initiates and activates the electrolyte is not entirely understood. The high-pressure shock wave also generates local defects. Thus, when a high-pressure shock wave propagates through the electrolyte, the crystalline particles of the electrolyte are deformed and regular atomic arrangements in the crystallites dislocated. This results in both line defects and point defects. In addition to atomic level defects, such a high-pressure shock wave rapidly deforms particles of electrolyte and brings the particles into intimate contact, as well as removing surface oxides and other similar electrical barriers. In general therefore, initiation by a high-pressure shock wave as used herein refers to the overall transition of the electrolyte from its inactive state to its active state. Nevertheless, the term "shock battery" is used herein to describe one use of the invention for the sake of simplicity.

According to one aspect of this invention, the electrolyte material may be arranged in a layer, at least one face of which is generally planar. The wave-front of the high-pressure shock wave may also be generally planar. In such a case, at least one face of the electrolyte material lies in a plane which is generally parallel to the plane of the high-pressure shock wave front. Thus, the face of the layer of electrolyte material is generally perpendicular to the direction in which the shock wave is propagated.

The electrolyte, in one aspect of this invention, comprises a mass of powder material in compacted but low density form. In such a case, when the wave-front of the high-pressure shock wave contacts the face of the layer of electrolyte material and begins to propagate therethrough, the movement of the plane of the wave-front is attenuated and the shock wave moves through the layer of electrolyte material in a direction generally perpendicular to its direction of propagation. If the layer of electrolyte material is in the form of a disc such that one face of the disc faces the source of the high-pressure shock wave, when the high-pressure shock wave propagates through the disc, the movement of the wave-front of the shock wave is converted to radial movement from the rim of the disc toward the center of the disc. This is referred to herein as the wave-trapping phenomenon.

In FIG. 1, one embodiment of a shock-activated electrochemical power supply according to this invention is disclosed wherein 1 is a generally disc-shaped electrolyte body, 2 is a cathode in contact with one face of the disc and 3 is an anode in contact with the other face of the disc. The anode and cathode are in contact with current collectors 4, formed, e.g., of copper. The electrolyte, anode and cathode comprise the electrochemical cell and are protected by a generally tubular insulator 5 formed of, e.g., polytetrafluoroethylene. The electrochemical cell is contained in a housing indicated generally at 6 which can be formed of, e.g., copper. The battery is activated by shock from the direction shown generally at 7.

Figure 2:
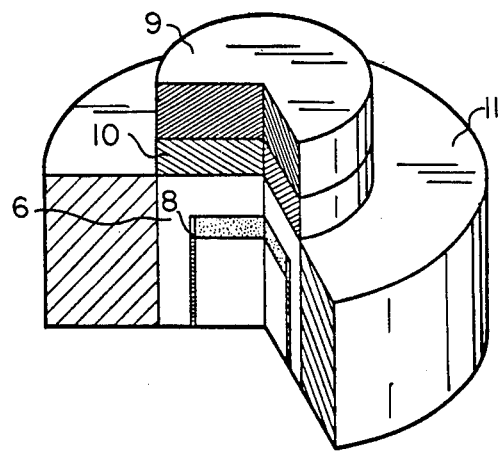
FIG. 2 is a schematic representation of a shock-activated electrochemical power supply of this invention wherein the shock is supplied via explosive loading.

FIG. 2, discloses a shock-activated electrochemical cell which is activated by explosive loading. The system includes the electrochemical cell of FIG. 1, indicated generally at 8 along with the housing thereof indicated generally at 6. A body of explosive material, together with a shock wave-shaping material 9, is formed of, e.g., Composition B and Baratol, high explosive, a steel disk 10 is positioned at one end of the housing such that the plane of the electrolyte disc is generally perpendicular to the direction of propagation of the shock wave. The housing is surrounded by an annular containment means 11 formed of, e.g., high strength steel.

Although the invention is illustrated in terms of a single electrochemical cell, a plurality of such cells may be initiated by such a high-pressure shock wave. Thus, an electrochemical power supply of this invention could comprise a number of such electrochemical cells arranged such that they may all be subjected to such a high-pressure shock wave. In general, such an arrangement can be a stacked array wherein the anode of one cell is placed opposite the cathode of another. Such a series can be continued indefinitely so long as the cell which is furthest away from the source of the high-pressure shock wave is subjected to sufficient energy from the high-pressure shock wave. When the electrochemical power source comprises a plurality of electrochemical cells, the cells are preferably insulated from each other by barrier means such as polytetrafluoroethylene or like materials which remain electrically insulating under shock pressure.

It is preferable to use an electrolyte material which has the greatest possible response to a high-pressure shock wave. Electrolytes used in typical thermal batteries are also useful in the shock-activated batteries of this invention. Thus, electrolyte materials such as LiCl-KCl eutectic mixtures which have a high electrical impedance in the unactivated state to ensure long cell life but which provide good ionic conductivity when activated may be used. The electrolyte is placed between anodic and cathodic materials in the form of powder compacts whose densities are typically 25 to 60 percent of the solid density of the electrolyte. During the shock pulse, the output current density of the battery operating with a low impedance external electrical load is limited by the ionic conductivity of the shock-compressed electrolyte. The shock compression of the electrolyte compacts it to a higher density thereby causing a largely irreversible increase in temperature and introducing numerous defects. In the heated solid state, the conductivity is enhanced by the introduction of defects. In the melted state, the conductivity is greatly enhanced and substantially greater current densities are achieved than in the solid state. Depending upon whether the shock-induced increase in temperature causes melting at the shock pressure, the electrolyte will be either in the defective solid or liquid state under the action of the pressure pulse. Upon release of pressure, a liquid state may be achieved at atmospheric pressure even though the electrolyte may not have melted in the high pressure state. In such cases, substantial current densities may be drained until the electrolyte freezes.

Materials suitable for use as the anodic and cathodic materials for the present invention also include those available for prior applications with thermal batteries. Enhanced sensitivity to shock activation can be optimized by matching the electrolyte material pressure and intensity of the shock wave to high pressure shock waves can be conventionally produced over a wide range of pressures and intensities. For any given material, one can routinely optimize the pressure and intensities of the shock wave, as exemplified below.

Various means for generating a high-pressure shock wave are known in the art. In general, any source of high-energy, high shock pressure can be used.

In one embodiment of this invention, the means for generating the high-pressure shock wave is a high explosive plane-wave generator. As is well known in the art, high explosives generate high pressure shock, as opposed to pyrotechnics which generate heat. Suitable high explosive plane-wave generators include plane-wave lenses which are well known. An electrochemical power supply of this invention using such a plane wave generator can comprise an electrochemical cell to which the plane wave generator is attached. The electrochemical cell and plane wave generator are positioned relative to each other such that the highpressure shock wave resulting from the plane wave generator is propagated through the electrolyte of the electrochemical cell. It is preferable to position the plane wave generator and electrochemical cell in such proximity that the electrolyte is initiated by the resultant high-pressure shock wave but that the stress applied to the other components of the cell is minimized. A distance of from about 4 to 8 cm has been found to be acceptable. The optimum distance from the plane wave generator to the electrolyte depends, in part, on the sensitivity of the particular electrolyte used to the pressure of the generated shock wave. Other explosive high pressure shock wave generators which contain limited amounts of explosives will minimize damage to other components of the electrochemical cell.

A pulsed radiation source can also be used to generate a high-pressure shock wave. This can be accomplished by providing a confined body of material which expands in response to said radiation in immediate proximity with the electrolyte to be activated. Exemplary materials are high expansion metals. The electrolyte is activated by causing a high energy radiation pulse to impinge on the confined body of material. In response thereto, the confined body is heated extremely rapidly and therefore expands extremely rapidly generating a high-pressure shock wave. The resultant high-pressure shock wave is used in much the same way as the high-pressure shock wave resulting from the plane wave generator above. In general, any high energy pulsed radiation source can be used. Electron beam generators and lasers are preferred. If a laser is used, laser pulse durations of about 50 nanoseconds are preferred.

The high-pressure shock wave can also be generated by means of mechanical impact. Thus, an impacting system could be used to impact a body in contact with the electrolyte of an electrochemical cell to generate and propagate a shock wave therethrough. Such an impacting system could include but is not limited to, projectiles and the like.

In an embodiment of one aspect of the invention, the electrolyte and other components of the electrochemical cell are arranged annularly around the means for generating the high-pressure shock wave. In this embodiment, the electrolyte substantially envelopes the source of the high-pressure shock wave so that substantially all of the energy from the shock wave source can be utilized. The arrangement of the electrochemical cell components is similar to that of a stacked-disc array except that the array in this case is concentric. Thus, the outer annular electrode of one cell faces the inner annular electrode of the next outermost cell; the electrodes of the adjacent cells being separated by suitable insulating material as in the stacked array. The way in which the wave-front propagates through the electrolyte layer of this embodiment is similar to the way in which it propagates through the electrolyte disc layer of the stacked array. For purposes of illustration, if an omni-directional high-pressure shock wave generator is placed in the center of such an annular array, the resultant shock wave-front would be generally cylindrical or generally spherical. In such a case, when the high-pressure shock wave-front enters the electrolyte layer a component of force would be generated in the direction around the annulus of the electrolyte layer. While this embodiment has been illustrated as an annular array, it will be understood that a spherical array could be used also.

The electrochemical power supply of this invention also can comprise connection means for connecting the electrodes to an external circuit and for electrically connecting the electrochemical cells to each other if more than one cell is used. Containment means for the entire electrochemical power supply is also provided. The connection means can be part of or separate from the containment means.

The shock-activated electrochemical power supply of this invention is activated by initiating the means for generating the high-pressure shock wave which in turn initiates the electrolyte. The time from the first application of shock pressure to the onset of full power is determined by the shock wave transit time through the electrochemical cell, or through all of the electrochemical cells if more than one electrochemical cell is employed and the kinetics of shock-activation as well as the electrochemical response of the materials involved. For optimization of performance and initiation time, not only is the electrolyte selected to match the parameters of the generated shock wave, but the electrolyte and electrode materials are selected to electrochemically match each other as is known.

The duration of the power from the electrochemical cell is determined by the life of the containment means as well as the life of the electrical connections and electrodes of the system. In general, the battery will remain active and useful for such time as the electrical connections remain intact. In general, the duration of the power which can be obtained from the electrochemical power supply of this invention is about two orders of magnitude greater than the duration of the high-pressure shock wave used to initiate the electrochemical cell.

Because the action of the shock is to greatly enhance solid state reactivity, the principle of this invention may also be used to prepare or precondition electrolytic materials whereby their melt temperatures are reduced from those of the starting powders.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Three shock-activated electrochemical power supplies were constructed as shown in FIGS. 1 and 2. The power supplies comprised an electrochemical cell comprising a Li(Si) anode, a FeS$_2$ cathode (comprising 64% FeS$_2$ with KCl.LiCl eutectic and 12% SiO$_2$ binder) and an inactive electrolyte therebetween comprising a LiCl.KCl eutectic (65% LiCl.KCl, 35% MgO binder) having a melting point of 352° C. and compacted to a density of 45% of solid density. A means for generating a high-pressure shock wave was attached to the end of the cell at a distance of about 6 cm. The shock wave generator comprised a 50 mm plane wave lens and an explosive disc 12 mm in thickness. Three different shock wave generators were used; one on each cell. Each shock wave generator was tailored to induce plane wave explosive loading on the electrolyte. Baratol or composition B high explosives were employed. These explosives produce peak pressures of from 75 to 220 kbar in the electrolyte. The first shock wave generator generated a high-pressure shock wave of 75 kbar, the second generated a high-pressure shock wave of 150 kbar and the third generated a high-pressure shock wave of 250 kbar. It was found that the shock-activated electrochemical power supply having the lowest pressure shock wave (75 kbar) exhibited optimum performance (i.e. largest and most persistent signal) demonstrating that the LiCl.KCl eutectic electrolyte, as well as the anode and cathode materials, respond best at the lower pressure. Thus, the electrolyte materials were optimally matched for a shock-wave pressure of 75 kbar or less, relative to the higher pressures of the other shock generators.

This optimized cell was initiated or activated within less than one microsecond after the shock wave enveloped the electrolyte. An electrical current of 5 milliamps/cc conducted through a load of 50 ohms resulted. The electrochemical power supply continued to release electrical current for 400 microseconds, a duration of about two orders of magnitude greater than the duration of the pulse which initiated the electrochemical power supply.

EXAMPLE 2

An electrochemical power supply similar to the optimal unit of Example 1 was constructed and initiated. An open circuit voltage of 2 volts resulted and persisted throughout the observation time of 1.2 milliseconds.

EXAMPLE 3

An electrochemical power supply similar to the optimal unit of Example 1 was constructed and initiated. A load of 7.5 ohms was placed in the circuit and a peak voltage of 2.2 volts resulted.

EXAMPLE 4

An electrochemical power supply similar to the optimal unit of Example 1 was constructed and initiated. A load of 0.5 ohms was placed in the circuit and a peak current of 500 milliamps/cm$^2$ of electrolyte area resulted.

In each of the above examples, the largest currents were not observed until after release of pressure, indicating that the electrolyte melted upon release of pressure. In all cases the electrical signals persist for times much longer than the shock event, demonstrating that upon initiation, the electrochemical cell continues to function properly and that signals from shock actuated batteries persist until the electrolyte cools to much lower temperatures. In all cases, initiation of the electrochemical signals is observed to occur in times less than one microsecond.

EXAMPLE 5

An electrochemical cell similar to the optimal unit of Example 1 was constructed and initiated. The electrolyte was compacted to a density of 21% of solid density. A load of 0.5 ohms was placed in the circuit and a current of 150 milliamps/cm$^2$ was observed while the electrolyte was under high pressure, indicating that the shock-induced increase in temperature due to the rapid compression of the electrolyte can control the melting under shock compression.

EXAMPLE 6

An electrochemical cell similar to the optimal unit of EXAMPLE 1 was constructed and initiated. The electrolyte was compacted to a density of 13% of solid density by the addition of glass hollow microspheres. A load of 0.5 ohms was placed in the circuit and a current of 400 milliamps/cm$^2$ of electrolyte area resulted while the electrolyte was at high pressure. This further indicates the role of shock-induced increase in temperature due to rapid compression of the electrolyte powder compact.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of initiating a thermal battery, which comprises an inactive electrolyte material capable of being rendered electrochemically active by a high pressure shock wave, comprising subjecting said electrolyte to a high pressure shock wave generated by a laser beam or an electron beam.

2. In a thermal battery comprising an anode, a cathode and a eutectic mixture of materials which are electrochemically active when molten at elevated temperatures, the improvement comprising means for generating a high-pressure shock wave operatively associated with said electrolyte such that the generated shock wave propagates through said electrolyte and renders said electrolyte electrochemically active, thereby delivering electrical power.

3. The battery of claim 1 wherein said means for generating said high pressure shock wave is a pulsed radiation source.

4. The battery of claim 3 wherein said pulsed radiation source is a laser.

5. The battery of claim 3 wherein said pulsed radiation source is an electron beam generator.

* * * * *